United States Patent
Freitag et al.

(10) Patent No.: US 7,816,486 B2
(45) Date of Patent: *Oct. 19, 2010

(54) BRANCHED POLYPHOSPHONATES

(75) Inventors: Dieter Freitag, Chelmsford, MA (US); Michael A. Vinciguerra, Hampton, NH (US); Norman Rice, Andover, MA (US); Richard Lusignea, Allston, MA (US)

(73) Assignee: FRX Polymers, Inc., Chelmsford, MA (US)

( * ) Notice: Subject to any disclaimer, the term of this patent is extended or adjusted under 35 U.S.C. 154(b) by 1144 days.

This patent is subject to a terminal disclaimer.

(21) Appl. No.: 10/546,668

(22) PCT Filed: Feb. 24, 2004

(86) PCT No.: PCT/US2004/005337

§ 371 (c)(1),
(2), (4) Date: May 24, 2006

(87) PCT Pub. No.: WO2004/076536

PCT Pub. Date: Sep. 10, 2004

(65) Prior Publication Data

US 2007/0032633 A1 Feb. 8, 2007

Related U.S. Application Data

(63) Continuation-in-part of application No. 10/374,829, filed on Feb. 24, 2003, now Pat. No. 6,861,499.

(51) Int. Cl.
*C08G 79/02* (2006.01)

(52) U.S. Cl. .................................. 528/398; 528/167

(58) Field of Classification Search .................. 528/398
See application file for complete search history.

(56) References Cited

U.S. PATENT DOCUMENTS 2,435,252 A    2/1948   Fon Toy
2,534,242 A   11/1949   Cusic (Continued)

FOREIGN PATENT DOCUMENTS

DE        2909442        9/1980

(Continued)

OTHER PUBLICATIONS

Schmidt et al., Aromatische Polyphosphonate: Thermoplastische Polymere von extremer Brandwidrigeit, 1985, Die Angewandte Makromolekulare Chemie, 132(2165):1-8.

(Continued)

*Primary Examiner*—Randy Gulakowski
*Assistant Examiner*—Shane Fang
(74) *Attorney, Agent, or Firm*—Pepper Hamilton LLP (57) ABSTRACT

Disclosed are branched polyphosphonates produced using a polycondensation process, that result in polyphosphonates having a $T_g$ of at least 100° C., and which can be further processed to have improved hydrolytic stability compared to other polyphosphonates. The method and polyphosphonate compositions may be made from readily available starting materials providing lower cost fire retardant materials. Also disclosed are polymer compositions that comprise these branched polyphosphonates and at least one other polymer, wherein the resulting polymer compositions exhibit flame retardant properties.

44 Claims, 1 Drawing Sheet

(A)　　　(B)　　　(C)

U.S. PATENT DOCUMENTS

| | | | |
|---|---|---|---|
| 2,534,252 A | 12/1950 | Engler | |
| 2,682,522 A | 6/1954 | Coover, Jr. et al. | |
| 2,891,915 A | 7/1954 | McCormack et al. | |
| 2,716,101 A | 8/1955 | Coover, Jr. et al. | |
| 3,153,008 A | 10/1964 | Fox | |
| 3,271,329 A | 9/1966 | Coover, Jr. et al. | |
| 3,326,852 A | 6/1967 | Thomas | |
| 3,442,854 A | 5/1969 | Curtius et al. | |
| 3,719,727 A | 3/1973 | Masai et al. | |
| 3,829,405 A | 8/1974 | Cohen et al. | |
| 3,830,771 A | 8/1974 | Cohen et al. | |
| 3,919,363 A | 11/1975 | Ura et al. | |
| 3,925,303 A | 12/1975 | Rio et al. | |
| 3,932,351 A | 1/1976 | King | |
| 3,932,566 A | 1/1976 | Reader | |
| 3,946,093 A | 3/1976 | Koto et al. | |
| 3,952,072 A | 4/1976 | Yonemitsu et al. | |
| 4,033,927 A | 7/1977 | Borman | |
| 4,046,724 A | 9/1977 | Kato et al. | |
| 4,048,106 A | 9/1977 | Hermans | |
| 4,064,107 A | 12/1977 | Stackman et al. | |
| 4,078,016 A | 3/1978 | Kramer | |
| 4,093,582 A | 6/1978 | Mark et al. | |
| 4,152,373 A | 5/1979 | Honig | |
| 4,223,104 A | 9/1980 | Kim et al. | |
| 4,229,552 A | 10/1980 | Shiozaki et al. | |
| 4,254,177 A | 3/1981 | Fulmer | |
| 4,322,520 A | 3/1982 | Schmidt et al. | |
| 4,328,174 A | 5/1982 | Schmidt et al. | |
| 4,331,614 A | 5/1982 | Schmidt et al. | |
| 4,332,921 A | 6/1982 | Schmidt et al. | |
| 4,350,793 A | 9/1982 | Schmidt et al. | |
| 4,374,971 A * | 2/1983 | Schmidt et al. | 528/167 |
| 4,377,537 A | 3/1983 | Block et al. | |
| 4,401,802 A | 8/1983 | Schmidt et al. | |
| 4,408,033 A | 10/1983 | Hefner, Jr. | |
| 4,415,719 A | 11/1983 | Schmidt et al. | |
| 4,474,937 A | 10/1984 | Bales | |
| 4,481,350 A | 11/1984 | Schmidt et al. | |
| 4,508,890 A | 4/1985 | Schmidt et al. | |
| 4,594,404 A | 6/1986 | Kawakami et al. | |
| 4,719,279 A | 1/1988 | Kauth et al. | |
| 4,762,905 A | 8/1988 | Schmidt et al. | |
| 4,782,123 A | 11/1988 | Kauth et al. | |
| 4,788,259 A | 11/1988 | Nielinger et al. | |
| 5,003,029 A | 3/1991 | Ueda et al. | |
| 5,034,056 A | 7/1991 | VonBonin | |
| 5,039,775 A | 8/1991 | Oyaizu | |
| 5,086,153 A | 2/1992 | Oyaizu | |
| 5,216,113 A | 6/1993 | Schulz-Schlitte et al. | |
| 5,319,058 A | 6/1994 | Hattori et al. | |
| 5,334,692 A | 8/1994 | Hess et al. | |
| 5,525,681 A | 6/1996 | Barron et al. | |
| 5,639,800 A | 6/1997 | VonBonin et al. | |
| 5,719,200 A | 2/1998 | Staendeke et al. | |
| 5,919,844 A | 7/1999 | Shimizu et al. | |
| 5,922,826 A * | 7/1999 | Kuze et al. | 528/196 |
| 6,066,700 A | 5/2000 | Konig et al. | |
| 6,288,210 B1 | 9/2001 | Shobha et al. | |
| 6,291,630 B1 | 9/2001 | Konig et al. | |
| 6,861,499 B2 * | 3/2005 | Vinciguerra et al. | 528/398 |
| 2004/0167284 A1 | 8/2004 | Vinciguerra et al. | |
| 2005/0020800 A1 | 1/2005 | Levchik et al. | |
| 2005/0222370 A1 | 10/2005 | Freitag et al. | |
| 2006/0020104 A1 | 1/2006 | Freitag | |

FOREIGN PATENT DOCUMENTS

| | | |
|---|---|---|
| EP | 0021260 A | 1/1981 |
| EP | 0028345 A | 5/1981 |
| EP | 0033077 A | 8/1981 |
| EP | 0034697 A | 9/1981 |
| EP | 0077493 B1 | 3/1987 |
| EP | 0242732 A | 10/1987 |
| EP | 1026191 A | 8/2000 |
| GB | 2043083 | 1/1980 |
| JP | 63054010 | 3/1988 |
| JP | 2000219745 | 8/2000 |
| WO | WO 99/46315 | 9/1999 |
| WO | WO 9946315 A | 9/1999 |
| WO | WO 03/029258 A1 | 4/2003 |
| WO | WO 2004/076536 | 9/2004 |
| WO | WO 2004/076537 | 9/2004 |

OTHER PUBLICATIONS

Billmeyer, Textbook of Polymer Science, $2^{nd}$ ed., Wiley Interscience, New York, 1971, pp. 45-52.

Legrand et al., eds., Handbook of Polycarbonates, Marcel Dekker, Inc., New York, 2000 (TOC).

Levchik et al., Overview of Recent Developments in the Flame Retardancy of Polycarbonates, Polymer International, 54(7):981-998.

Cotter et al., Engineering Plastics: A Handbook of Polyarylethers, Science Publ. S.A., Switzerland 1995 (TOC).

Groggins, Unit Processes in Organic Synthesis, $4^{th}$ ed., McGraw Hill Book Co., 1952, pp. 616-620.

Morgan, Condensation Polymers, Wiley Interscience, New York, 1965, pp. 217-223.

American Society for Test Methods; Test ASTMD2863; http://www.astm.org/cgi-bin/SoftCart.exe/DATABASE.CART/REDLINE_PAGES/D2863.htm?L+mystore+ttqw1337.

Hagenaars et al., Characterization of Melt-Polymerized Polycarbonate: Preparative Fractionation, Branching Distribution and Simulation, 2001, Polymer, 42:7653-7661.

* cited by examiner

FIG. 1

BRANCHED POLYPHOSPHONATES

CROSS REFERENCE TO RELATED APPLICATIONS

This application claims priority International Application No. PCT/US2004/005337 filed on February 24, 2004 and published as WO 2004/076536, which further claims priority to and is a continuation in part of U.S. Non-Provisional Application No. 10/374,829 filed February 24, 2003, now U.S. Pat. No. 6,861,449.

BACKGROUND

Polyphosphonates are known to exhibit excellent fire resistance and it is known (see e.g., U.S. Pat. No. 2,682,522) that linear polyphosphonates can be produced by melt condensing a phosphonic acid diaryl ester and a bisphenol using a metal catalyst (e.g., sodium phenolate) at high temperature. This approach produced low molecular weight polyphosphonates that exhibited poor toughness.

Consequently, to improve toughness a synthetic approach to produce branched polyphosphonates by the transesterification process was developed (see e.g., U.S. Pat. No. 4,331,614). This approach involved the transesterification reaction of a phosphonic acid diaryl ester, a bisphenol, a branching agent (tri or tetra phenol or phosphonic acid ester), and a preferred catalyst (e.g., sodium phenolate) carried out in the melt, usually in an autoclave. Several patents have addressed the use of branching agents in polyphosphonates (see e.g., U.S. Pat. Nos. 2,716,101; 3,326,852; 4,328,174; 4,331,614; 4,374,971; 4,415,719; 5,216,113; 5,334,692; and 4,374,971). These approaches produced branched polyphosphonates, however their cost and properties were not sufficient for general acceptance in the marketplace. For example in branched polyphosphonates (see e.g., U.S. Pat. No. 4,331,614), the number average molecular weights as high as 200,000 g/mole are claimed with a minimum requirement of 11,000 g/mole with polymer dispersities less than 2.5. Consequently these polyphosphonates exhibited high melt viscosities. This approach was successful in producing high molecular weight polyphosphonates that exhibited improved toughness, but processability was sacrificed. Another disadvantage for this process is that it requires high purity monomers, preferably greater than 99.7% that make it expensive. Another shortcoming of both the linear and branched polyphosphonates was the lack of hydrolytic stability, some haze, and in the case of less expensive high volume bisphenols like bisphenol A, limited and insufficient heat stability as determined by $T_g$.

In summary, linear polyphosphonates produced by the transesterification process exhibited excellent flame resistance and good melt flow (e.g., good processability), but were brittle due to low molecular weight. Branched polyphosphonates produced by the transesterification process exhibited excellent flame resistance and good toughness, but were not easily melt processable due to high molecular weight and low polydispersity. For polyphosphonates made from less expensive high volume bisphenols like bisphenol A, the polyphosphonate had poor thermal and hydrolytic stability.

Quaternary phosphonium catalysts and aqueous-phenol based quaternary phosphonium catalyst mixtures have reportedly been used in the synthesis of polycarbonates (see e.g., U.S. Pat. Nos. 3,442,854 and. 6,291,630B1). However, these catalysts have not been applied to the synthesis of polyphosphonates, nor is it obvious that they would work better than any other known or preferred catalysts for these materials.

SUMMARY

In view of their desirable flame retardant properties, there is a need for branched polyphosphonates which are tough, easily melt processable, exhibit improved thermal and hydrolytic stability. This combination of properties has not been achievable in a cost effective manner by past synthetic approaches or compositions. Embodiments of the present invention are directed to a compositions and a process of making branched polyphosphonates from less expensive high volume bisphenols like bisphenol A and other low cost and readily available reagents. The polyphosphonates of the present invention are easily melt process able, are tough, transparent, have improved thermal stability, and can be made to have enhanced hydrolytic stability.

An embodiment of the present invention is a method of making easily moldable polyphosphonates that includes heating in a vessel a removable polymerization catalyst, preferably a phosphonium catalyst, with an amount of phosphonic acid diaryl ester and a bisphenol in a ratio to form a polyphosphonate. The heating is performed at a reduced pressure in the vessel to remove a hydroxy aromatic compound generated by the reaction and heating. The amount of phosphonic acid diaryl ester and a bisphenol can be in a stoichiometric or non-stoichiometric ratio to form the polyphosphonate. At least a portion of the polymerization catalyst is removed from the vessel by the heating and reduced pressure and can include but is not limited to catalysts which evaporate, sublime, or are thermally degraded. The phosphonic diaryl esters, hydroxy aromatic compound(s) such as bisphenol A or a mixture of bisphenol A and other bisphenols wherein the amount of bisphenol A in the mixture may range from less than 100% to less than about 0.5%, heated in the presence of the catalyst form an easily moldable, transparent polyphosphonate having one or more of, and preferably the combination of a $T_g$ of at least 100° C., a polydispersity of 3.2 or more, preferably about 2.5 or more, and more preferably 2.3 or more, a $M_w$ of at least 10,000 g/mol, and a relative viscosity of greater than 1.1 when measured on a 0.5 percent solution in methylene chloride. Polydispersity and $M_w$ are the factors which relate to good processability and toughness of the polymers of the present invention. The phosphonic acid diaryl ester, bisphenol, and a polymerization catalyst may be added together or in any order that results in the transesterification reaction.

A branching agent may be used in the polymerization reaction and can include a branching agent which may be generated by action of the polymerization catalyst with a bisphenol and or by added tri or tetrahydroxy aromatic compounds or triaryl phosphoric acid esters. The branched polyphosphonate may be made by the catalytic polymerization of phosphonic acid diaryl, phosphoric acid triaryl and combinations of these with aromatic hydroxy compounds including dihydroxy, trihydroxy, tetrahydroxy and combinations of these aromatic hydroxy compounds. A portion of the polymerization catalyst may be removed during the heating. Preferably the catalyst has a vapor pressure which permits a portion or all of it to be removed during the heating process. The heating can be stopped when substantially all of the generated volatile hydroxy aromatic compound is removed from the reaction vessel.

Another embodiment of the present invention is a method of making a polyphosphonate that includes heating a polyphosphonate and a removable polymerization catalyst in a vessel to form a hydrolytically stable branched polyphosphonate at a reduced pressure. The reduced pressure can be used to remove a portion of the volatile catalyst from the vessel as well as residual monomers of the polycondensation and byproduct materials generated by the heating. The polyphosphonate which is heated with the removable polymerization catalyst preferably has a relative viscosity of greater than 1.05 when measured on a 0.5 percent solution in methylene chloride, is transparent, or has a $T_g$ of at least 90° C.

An embodiment of the present invention is a composition that includes a branched polyphosphonate characterized by having a $T_g$ of at least 100° C., made by heating an amount of phosphonic acid diaryl ester, bisphenol A monomer or a mixture of bisphenol A and other bisphenols, with a removable phosphonium catalyst in a vessel at a reduced pressure to form a polyphosphonate. The reduced pressure aids in the removal of volatile materials such as excess reagent, phosphonium catalyst, and reaction products generated by the heating. The polyphosphonate formed is an easily moldable thermoplastic that can also have a relative viscosity of greater than 1.1 when measured on a 0.5 percent solution in methylene chloride, a $M_w$ of at least 10,000 g/mol, is capable of being made transparent, and can have a polydispersity of 3.2 or more, preferably about 2.5 or more, and more preferably 2.3 or more. The polyphosphonate may be made by the catalytic polymerization of phosphonic acid diaryl, phosphoric triaryl ester and combinations of these with aromatic hydroxy compounds including dihydroxy, trihydroxy, tetrahydroxy and combinations of these aromatic hydroxy compounds. The phosphonic acid diaryl ester, a bisphenol, other reagents and the polymerization catalyst may be added together or in any order that results in the transesterification reaction. In a preferred embodiment the polyphosphonate is prepared by reacting at least methyl-phosphonic acid diphenyl ester, 2,2-bis(4-dihydroxyphenyl) propane and tetraphenylphosphonium phenolate catalyst in a vessel and heating under a reduced pressure.

Another embodiment of the present invention is a composition that is a hydrolytically stable branched polyphosphonate, characterized by having a $T_g$ greater than 100° C. made by heating an amount of a branched polyphosphonate with a removable polymerization catalyst in a vessel at a reduced pressure to remove a hydroxy aromatic compound generated by the heating. Preferably the polyphosphonate is made from bisphenol A or bisphenol A with other bisphenols wherein the amount of bisphenol A in the mixture may range from less than 100% to less than about 0.5%, a phosphonic diaryl ester, and phosphonium catalyst. The hydrolytically stable polyphosphonate can be made to have at least one, and preferably all of the following properties: transparent, a polydispersity of 3.2 or more, preferably about 2.5 or more, and more preferably 2.3 or more, $M_w$ greater that 15,000 g/mole, is an easily moldable thermoplastic, and has a relative viscosity of greater than 1.15, when measured on a 0.5 percent solution in methylene chloride. A preferred hydrolytically stable branched polyphosphonate is one wherein less than 0.5 grams of hydrolytically stable polyphosphonate is soluble in 100 ml volume of methylene chloride. The hydrolytic stability of the polyphosphonate can be characterized in that it forms less than 5% degradation products, has less than 5% loss of transparency, or less than 5% loss in strength when heated in boiling water for 6 hours. The polyphosphonate and polymerization catalyst may be added together or in any order that results in hydrolytically stable polyphosphonate material. The composition may be characterized in forming less than 5% degradation product and no loss in toughness when heated in boiling water for 6 hours. The polyphosphonate composition preferably is made by reacting at least tetraphenylphosphonium phenolate catalyst, methyl-phosphonic acid diphenyl ester, and 2,2-bis(4-dihydroxyphenyl)propane.

Another embodiment of the present invention is a process wherein a specific phosphonium catalyst and a range of stoichiometric or non-stoichiometric ratios of phosphonic acid diaryl ester to bisphenol provide branched polyphosphonates with a broad molecular weight distribution that in turn controls the toughness, processing characteristics and the glass transition temperature (Tg) of the polymer. This process can provide branched polyphosphonates with an excellent combination of toughness and processability, and surprisingly higher $T_g$ as compared to previously reported polyphopshonates. Optionally a second heating step can be used in the process that provides for an improvement in hydrolytic stability and haze (e.g., improved transparency) while maintaining processability. The method for producing these polyphosphonates includes heating a phosphonic acid diaryl ester, a bisphenol, and a tetraphenylphosphonium catalyst in a reaction vessel at reduced pressure to remove phenol generated by the heating to form a moldable polyphosphonate. The phosphonic acid diaryl ester being in a stiochiometric equivalent or non-equivalent amount of the bisphenol. The vessel in which the polyphosphonate is formed may include one or more phosphonic acid diaryl ester, bisphenols, and a branching agent which is added or generated in situ. Preferably the number of moles of reactive groups of the phosphonic acid diaryl ester is within about ±20% of the number of moles of reactive groups from the bisphenol. In the method, the tetraphenylphosphonium catalyst includes tetraphenylphosphonium phenolate, the branching agent includes 1,1,1-tris(4-hydroxyphenyl)ethane, the phosphonic acid diaryl ester includes methyl-phosphonic acid diphenyl ester, and the bisphenol includes 2,2-bis(4-hydroxyphenyl)propane or bisphenol A and any of 4,4'-dihydroxybiphenyl, 1,1-bis(4-hydroxyphenyl)-3,3-dimethyl-5-methyl cyclohexane, 4,4' dihydroxypdihenylsulfone, 4,4'-dihydroxydiphenyl ether, and 4,4'-dihydroxydiphenyl sulfide, or a combination these.

Another embodiment of the present invention is a method of making branched polyphosphonates that includes heating at a reduced pressure a branched polyphosphonate and a tetraphenylphosphonium catalyst in a vessel to form a hydrolytically stable branched polyphosphonate and removing materials such as hydroxy aromatic compounds generated by heating the catalyst and polyphosphonate together. Heating may be used to remove the tetraphenylphosphonium catalyst from the polyphosphonate.

Another embodiment of the present invention is branched polyphosphonate formed by heating a phosphonic acid diaryl ester, a bisphenol, and a tetraphenylphosphonium catalyst in a reaction vessel heated at reduced pressure to remove material generated by the heating to form a moldable and preferably transparent polyphosphonate. The reduced pressure may be used to remove, phenol, excess reagents, tetraphenylphosphonium catalyst or a combination of these from the reaction vessel. The phosphonic acid diaryl ester in the vessel can be a stiochiometric equivalent or non-equivalent to the amount of the bisphenol. The vessel may include one or more each of phosphonic acid diaryl esters, phosphoric triaryl esters, bisphenols, trihydroxy and tetrahydroxy aromatic compounds or a combination of these. The polyphosphonate prepared includes one or more, and preferably all of the following properties: a relative viscosity greater than 1.1 when measured on a 0.5 percent solution in methylene chloride at 23° C.; a polydispersity of 3.2 or more, preferably about 2.5 or more, and more preferably 2.3 or more; an $M_w$ of greater than 10,000 g/mol, a Tg of at least 100° C. as measured by differential scanning calorimetry when the polyphosphonate is made from a bisphenol that is bisphenol A or a combination of bisphenol A and other bisphenols and a phosphonium catalyst.

Another embodiment of the present invention includes a polyphosphonate and a tetraphenylphosphonium catalyst in a reaction vessel heated at reduced pressure to form a hydrolytically stable branched polyphosphonate and removing material generated by the heating such as, phenol, oligomeric phenols and catalyst. Preferably the polyphosphonate formed is moldable, and more preferably is characterized in that less than 0.5 g of the hydrolytically stable polyphosphonate is soluble in 100 ml of methylene chloride. The hydrolytically stable polyphosphonate includes one or more, and preferably all of the following properties when the hydrolytically stable polyphosphonate is made from a polyphosphonate prepared with bisphenol A or a mixture of bisphenol A and other bisphenols wherein the amount of bisphenol A in the mixture may range from less than 100% to less than about 0.5%, and a tetraphenylphosphonium catalyst. The hydrolytically stable polyphosphonate is transparent, has a $T_g$ of at least 100° C. (when the polyphosphonate includes structural units derived from bisphenol A or bisphenol A and other bisphenols), a polydispersity of 3.2 or more, preferably about 2.5 or more, and more preferably 2.3 or more, a $M_w$ of greater than 15,000 g/mol, and $\eta_{rel}$ 1.15 or more. Preferably the hydrolytic stability of the polyphosphonate can be characterized in that it forms less than 5% degradation products, has less than 5% loss of transparency, or less than 5% loss in strength when heated in boiling water for 6 hours.

Another embodiment of the present invention is a polymer composition that includes at least one polyphosphonate and at least one other polymer, preferably a thermoplastic polymer with which it is miscible. The polyphosphonate may be formed by heating a phosphonic acid diaryl ester, a bisphenol, and a phosphonium catalyst in a reaction vessel at reduced pressure to form a polyphosphonate and removing material generated by the heating from the vessel. The phosphonic acid diaryl ester can be in a stiochiometric equivalent or non-equivalent amount compared to the bisphenol. The vessel may include one or more each of phosphonic acid diaryl ester, bisphenols, as well as tri aryl esters, tri and tetra hydroxy compounds. Preferably the polyphosphonate is moldable, and can be made to include one or more, and preferably all of the following properties such as being transparent, having a $T_g$ of at least 100° C. (when the polyphosphonate prepared with bisphenol A or a mixture of bisphenol A and other bisphenols wherein the amount of bisphenol A in the mixture may range from less than 100% to less than about 0.5%, and a phosphonium catalyst), a polydispersity of 3.2 or more, preferably about 2.5 or more, and more preferably 2.3 or more, a $M_w$ greater than about 10,000 g/mol or more, or an $\eta_{rel}$ of at least 1.1.

The thermoplastic polymer may include but is not limited to a polycarbonate, polyacrylate, polyacrylonitrile, polyester, polyamide, polystyrene, polyurethane, polyepoxy, poly(acrylonitrile butadiene styrene), polyimide, polyarylate, poly(arylene ether), polyethylene, polypropylene, polyphenylene sulfide, poly(vinyl ester), polyvinyl chloride, bismaleimide polymer, polyanhydride, liquid crystalline polymer, polyether, polyphenylene oxide, cellulose polymer, a hydrolytically stable polyphosphonate, or a combination of these. Preferred embodiments include miscible thermoplastic polymers that are substantially polycarbonate, or polystyrene and polyphenylene oxide, or polycarbonate and poly(acrylonitrile butadiene styrene). Preferably the composition exhibits a limiting oxygen index of at least 27.

Another embodiment is a polymer composition that includes at least one hydrolytically stable polyphosphonate and at least one other polymer, preferably a thermoplastic polymer with which it is miscible. The hydrolytically stable polyphosphonate may be formed from a polyphosphonate and a phosphonium catalyst in a reaction vessel that is heated at reduced pressure to form a hydrolytically stable polyphosphonate and removing material generated by the heating. The hydrolytically stable polyphosphonate is moldable and preferably can be made to have one or more of the following properties including transparency, a $T_g$ at least 100° C. (when the hydrolytically stable polyphosphonate is made from a polyphosphonate prepared with bisphenol A or a mixture of bisphenol A and other bisphenols wherein the amount of bisphenol A in the mixture may range from less than 100% to less than about 0.5%, and a phosphonium catalyst), a polydispersity of 3.2 or more, preferably about 2.5 or more, and more preferably 2.3 or more, an $M_w$ of greater than about 15,000 g/mol, or an $\eta_{rel}$ of at least 1.15. The miscible thermoplastic polymer may include but is not limited to a polycarbonate, polyacrylate, polyacrylonitrile, polyester, polyamide, polystyrene, polyurethane, polyepoxy, poly(acrylonitrile butadiene styrene), polyimide, polyarylate, poly(arylene ether), polyethylene, polypropylene, polyphenylene sulfide, poly(vinyl ester), polyvinyl chloride, bismaleimide polymer, polyanhydride, liquid crystalline polymer, polyether, polyphenylene oxide, cellulose polymer, a polyphosphonate having a $T_g$ at least 100° C., or a combination of these. Preferred embodiments include miscible thermoplastic polymers that are substantially polycarbonate, or polystyrene and polyphenylene oxide, or polycarbonate and poly(acrylonitrile butadiene styrene). Preferably the composition exhibits a limiting oxygen index of at least 27.

Another embodiment of the present invention includes articles of manufacture made from the branched polyphosphonates, hydrolytically stable polyphosphonates, or from polymer compositions comprising these branched polyphosphonates. The branched polyphosphonates and polymer compositions of the present invention can be used as coatings on plastics, metals, ceramic, or wood products or they can be used to fabricate free-standing films, fibers, foams, molded articles, and fiber reinforced composites.

Another embodiment of the present invention is use of a catalyst to catalyze the reaction of bisphenol A and lower alkyl phosphonic diaryl esters to form polyphosphonates with higher polydispersity and higher $T_g$ compared to a polyphosphonate formed from similarly reacting sodium phenolate, bisphenol A, and the lower alkyl phosphonic diaryl esters. Preferred catalysts used in the present invention are those that when heated with a polyphosphonate prepared with the same or a similar catalyst, further results in an increase in the hydrolytically stability of the starting polyphosphonate, and preferably form a hydrolytically stable polyphosphonate characterized in that less than 0.5 g of the hydrolytically stable polyphosphonate is soluble a volume of 100 ml methylene chloride.

Advantageously the present invention provides polyphosphonates which have a combination of good toughness, and processability. Without wishing to be bound by theory, this combination of properties is in part due to the high polydispersity of the polymer, which can be 3.2 or more, preferably about 2.5 or more, and more preferably 2.3 or more, and which indicates the presence of both high and low molecular weight branched polyphosphonates. The high molecular weight polyphosphonates provide for greater polymer toughness and the low molecular weight polyphosphonates provide for improved polymer processability. Without wishing to be bound by theory, the polyphosphonate's high polydispersity may in part be due to the reaction of about ±20% stoichiometric or non-stoichiometric ratios of bisphenols like bisphenol A and phosphonic diaryl ester with a catalyst that minimizes side reactions of these bisphenols. Low haze in the polyphosphonates of the present invention may be due to this reduction in side reactions between bisphenols like bisphenol A and the catalyst and removal of these lower levels of side reaction by-products by the extended distillation.

When about a ±20% stoichiometric or non-stoichiometric ratio of bisphenol A and phosphonic diaryl ester are polymerized with this catalyst, the glass transition temperature, $T_g$, of the resulting branched polyphosphonates is at least 10° C. higher than the $T_g$ of a polyphosphonate prepared from bisphenol A and phosphonic diaryl ester with a sodium phenolate catalyst.

In addition to improving the $T_g$ and polydispersity of polyphosphonates formed from about a ±20% stoichiometric or non-stoichiometric ratio of bisphenols like bisphenol A and phosphonic diaryl ester, a further advantage of the catalyst of the present invention is that it can be used to further increase the hydrolytic stability of these polyphosphonates. The catalyst may be used to promote further branching and chain growth of the polyphosphonate to form higher molecular weight materials including those which exhibit exceptional hydrolytic stability and are no longer soluble in methylene chloride, but which are still moldable and processable. Without wishing to be bound by theory, the partial loss by vaporization or degradation of the catalyst in the polyphosphonate melt decreases the amount of catalyst in the final polyphosphonate thereby improving its hydrolytic stability.

While reaction of a phosphonium catalyst and non-stoichiometric or stoichiometric ratios of phosphonic diaryl ester and bisphenols like bisphenol A can form a polyphosphonate with polydispersity of 3.2 or greater, preferably about 2.5 or greater, and more preferably 2.3 or greater, $M_w$ of 10,000 or greater, and a $T_g$ at least 10° C. higher than the same monomers polymerized with a sodium phenolate catalyst, the present invention is not limited to any particular catalyst, bisphenol, or phosphonic diaryl ester. For example, bisphenol A may be combined with other bisphenols wherein the amount of bisphenol A in the mixture may range from less than 100% to less than about 0.5%, and then combined with phosphonic diaryl ester and catalyst to give polyphosphonates.

Advantageously the method of the present invention allows the use of less pure (e.g., less expensive) monomers and less expensive hydroxy phenols such as bisphenol A. This makes it economically feasible and cost effective to manufacture of a variety of products and building materials from these polyphosphonates either alone or with other engineering materials, which take advantage of the unique flame retardant properties of these polyphosphonates.

The improved hydrolytic stability of compositions of the present invention materials is advantageous during molding operations or when articles made from these polyphosphonates are used in high heat and moisture environments such as automotive, marine, or aircraft. In order to form a successful molding resin on a commercial scale, a polymer should be capable of being molded conveniently without significant degradation in physical properties.

Clarity is important because in optical applications or those applications where articles must be transparent. Polyphosphonates of the present invention can be prepared to exhibit high impact resistance as well as optical clarity permitting them to be employed as lenses, shields, and windows as a result of their transparency.

Advantageously the polyphosphonates of the present invention have higher glass transition temperatures and are therefore more resistant to softening when heated providing greater toughness under these conditions. In certain molding operations, it is desirable to use a branched polyphosphonate with high melt strength. For example, blow molding of bottles and extrusion of sheet products from polyphosphonate requires the polyphosphonate have high melt strength. Moreover, branched polyphosphonate resins can be used in extrusion processes for the production of profiles, solid sheets, multi-wall sheets, corrugated sheets or other structural materials.

DESCRIPTION OF THE DRAWINGS

In part, other aspects, features, benefits and advantages of the embodiments of the present invention will be apparent with regard to the following description, appended claims and accompanying drawings where:

DETAILED DESCRIPTION

Before the present compositions and methods are described, it is to be understood that this invention is not limited to the particular molecules, compositions, methodologies or protocols described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference. Nothing herein is to be construed as an admission that the invention is not entitled to antedate such disclosure by virtue of prior invention.

The present invention pertains to compositions and methods for preparing flame retardant, branched polyphosphonates that have an advantageous combination of properties including improved processability and toughness due to polydispersity of 3.2 or greater, preferably about 2.5 or greater, and more preferably 2.3 or greater; a Mw>10,000 g/mol, at least 10° C. higher $T_g$ (when based on polyphosphonates made with bisphenol A or bisphenol A in combination with other bisphenols, and methyl phosphonic diaryl ester) and low haze compared to similar polyphosphonate prepared using Bisphenol A and a sodium phenolate catalyst. The polyphosphonates of the present invention are made by a polymerization process by melt reacting a phosphonic acid diaryl ester, a bisphenol (bisphenol A or bisphenol A in combination with other bisphenols), an optionally added branching agent in the presence of a polymerization catalyst. The hydrolytic stability of polyphosphonates prepared in this way may be tailored by further reaction with added polymerization catalyst, preferably a phosphonium catalyst, and heating.

The terms "flame retardant", "flame resistant", "fire resistant" or "fire resistance", as used herein, mean that the polymer exhibits a limiting oxygen index (LOI) of at least 27.

The reaction conditions of the melt polymerization are not particularly limited and may be conducted in a wide range of operating conditions. Hence, the term "melt polymerization conditions" will be understood to mean those conditions necessary to effect reaction between the phosphonic acid diaryl ester and a dihydroxy aromatic compound with a polymerization catalyst, preferably a phosphonium catalyst. The phosphonic acid diaryl esters and, optionally, phosphoric triaryl ester are reacted with the aromatic dihydroxy compounds which may be mixed with trihydroxy or tetrahydroxy compounds in a moisture and oxygen-free atmosphere which may include but is not limited to a reduced pressure and or a sparge of an inert gas like nitrogen or argon. The temperature of the reaction vessel may be in the range of from about 100° C. to 350° C. and, more particularly, at temperatures in the range from 200° C. to 310° C.

The reaction is preferably conducted at a high temperature in the melt under a reduced pressure. The reaction temperature and pressure can be adjusted at several stages during the course of the reaction. The temperature may be changed during the reaction within this range without limitation. While the volatile hydroxy aromatic compounds such as phenol are distilled off at elevated temperature, preferably at a reduced pressure which can include a purge of inert gas, the reaction is continued until the required degree of condensation is reached which may be indicated by a decrease or cessation of evolved reaction products. The pressure of the reaction vessel is chosen to aid in the removal of volatile reaction products, excess reagents, and a polymerization catalyst, preferably a removable phosphonium catalyst, from the vessel. Without limitation the pressure may be chosen to accomplish this effect and may range from above atmospheric pressure to below atmospheric pressure. Preferably at any time during the reaction process, the vessel pressure include pressure in the range from about 760 mm Hg to about 0.3 mm Hg or less. The reaction time depends upon a number of factors including but not limited to the temperature, concentration, removal of reactants from the vessel, and or the inclusion of additional heating and catalyst additions. Generally the reaction is completed when excess reagents and volatile reaction products are removed from the vessel in an amount to provide a polyphosphonate or hydrolytically stable polyphosphonate with desired transparency, $T_g$, $M_w$, relative viscosity, and polydispersity for its indented use. Preferably the reagents are heated for less than about 15 hours.

The melt polymerization may be accomplished in one or more stages, as is known in the art with other polymerization catalysts. The polymerization catalyst and any co-catalysts may be added together in the same stage or at different stages. The polymerization catalyst may be added in a continuous or semi-continuous manner to the vessel where one or more stages of the process are combined to form a single stage process. The melt polymerization to form the polyphosphonates of the present invention may be a batch or continuous flow process.

In one embodiment, the process is conducted in two stage process. In the first stage the polymerization catalyst, preferably a phosphonium catalyst, dihydroxy aromatic compounds, preferably bisphenol A or a mixture of bisphenol A and other bisphenols, and one or more diaryl phosphonates are heated together in a vessel under a reduced pressure. The first stage is conducted at a temperature sufficient to form a polyphosphonate and to remove by distillation or sublimation, volatile reaction products such a hydroxy aromatics, solvents, excess reagents, polymerization catalysts or a combination of these. It may be beneficial to use a condenser to selectively remove the volatile materials and to prevent removal of monomers. The polyphosphonate formed in the first stage may be cooled and in a second stage heated under a reduced pressure or heated under a reduced pressure in the presence of one or more additions of a polymerization catalyst, preferably a volatile phosphonium catalyst. Where desirable, the catalyst may be added to the vessel in a batch, semibatch or almost continuous manner. The catalyst may be added in its entire amount in the first stage, or it may be added in batches in the first, second, and subsequent stages so that the total amount is within the range required. Heating is continued to remove volatile reaction by-products, remove a portion and preferably all of the catalyst from the melt and form a hydrolytically stable material. Preferably less than 0.5 grams of the formed hydrolytically stable material is soluble in 100 milliliters of methylene chloride at room temperature or about 23° C.

It is preferable in the first, second, or any subsequent stages of the polycondensation step for the reaction temperature to be raised while the reaction system is reduced in pressure compared to the start of the reaction and thereby bringing about a reaction between the polymerization catalyst, when present, hydroxy aromatic compounds, phosphonic diaryl ester and phosphoric triaryl ester and any polyoligomeric phosphonates formed in the vessel. Where the melt polymerization is conducted at different temperatures, polymerization catalyst may be added at anytime during the heating, however it is preferably that the polymerization catalyst are added to the vessel when it is at a lower temperature in the heating cycle. Polymerization catalysts having high vapor pressures can be added to the melt at lower temperatures and or higher vessel pressures to maximize their contact time with the reactants. It is preferably to add the catalysts to the reaction vessel before the temperature is greater than about 200° C.

The reaction can be conducted as a batch, semibatch, or a continuous process. The material and the structure of the reactor used in the present invention is not particularly limited as long as the reactor has an ordinary capability of stirring, heating, reduced pressure, and ports for addition and removal of reagents, solvents, removable catalyst, or reaction by-products. The reactor is preferably equipped, for example with a temperature controlled condenser or cold finger, for the selective removal of by-product hydroxy aromatic compounds or phenol derived compounds formed such but not limited to those in formula (XI):

(XI)

where each $(R^{10})_v$ can independently be a hydrogen, lower alkyl, or isopropenyl, and v is an integer 1-5. These compounds can be generated as by products during the course of the polymerization reaction and some of these compounds may exist in an oligomeric form. It is preferable that the reactor is capable of stirring in relatively high viscosity conditions as the viscosity of the reaction system is increased in later stages of the reaction.

There may be a stoichiometric excess or imbalance (e.g., the molar ratio of phosphonic acid reactive groups to reactive groups of di, tri, tetra aromatic phenol) which may differ from an exact stoichiometric ratio. Preferably the number of equivalents or moles of reactive hydroxy groups of an aromatic hydroxy compound (di, tri, tetra aromatic, or combination) used to form the polyphosphonate to the number of equivalents of reactive groups of aryl phosphonate used to form the polyphosphonate are within about ±20%, can be within about ±15%, can be within about ±10% of each other, and can be within about ±5% or less. One skilled in the art would be able to make polyphosphonates of the present invention characterized by having at least one or all of relative viscosity greater than 1.1, polydispersity of 3.2 or greater, preferably about 2.5 or greater, and more preferably 2.3 or greater, an $M_w$ greater than about 10,000 g/mol, optically transparent, having a glass transition temperature of at least 100° C. (when the polyphosphonate is prepared with bisphenol A or a mixture of bisphenol A and other bisphenols and a phosphonium catalyst) with stoichiometric or non-stoichiometric ratios of these reagents. For example, an excess or deficiency of within approximately ±20% of the stoichiometric number of equivalents or moles of reactive hydroxy groups of bisphenol A to the number of equivalents of reactive groups of methyldiphenoxyphosphine oxide may be used in the practice of embodiments of this invention. This stoichiometric imbalance can be within about ±15 mole % excess of either the phosphonic acid diaryl ester or the bisphenol. This stoichiometric imbalance ratio can be within about 10 mole % excess of either the phosphonic acid diaryl ester or the bisphenol. It is surprising that such a large molar excess of the monomers leads to polyphosphonates with a desirable combination of properties.

The amount of hydroxy aromatic to aryl phosphonic acid ester used may be used to affect properties of the polyphosphonates. As an illustration, the first two samples in Example 5 where an excess of bisphenol is used, branched polyphosphonates prepared from methyldiphenoxyphosphine oxide and 2,2-bis(4-hydroxyphenyl) propane (bisphenol A) exhibit a $T_g$ of at least 105° C. These examples exhibit a weight average molecular weight ($M_w$) ranging from about 12,000 to about 14,000 g/mole with polymer dispersities greater than about 3. In comparison, branched polyphosphonates prepared from the same monomers using sodium phenolate as catalyst as disclosed in U.S. Pat. No. 4,331,614 exhibits a $T_g$ of only 90° C. (90.6° C. in the comparison Example 3 of the present disclosure), $M_n$ of 21,400 g/mole and a dispersity of less than 2.

The methods and compositions of the present invention produce polyphosphonates that may be characterized as exhibiting at least one, and preferably all of a broad molecular weight distribution with polydispersities of 3.2 or greater, preferably 2.5 or greater, and more preferably 2.3 or greater, an $M_w$ of greater than about 10,000, a $T_g$ of at least 100° C. (when polyphosphonate is prepared with bisphenol A or a mixture of bisphenol A and other bisphenols and a phosphonium catalyst), a relative viscosity of at least 1.1, transparency, and optionally hydrolytic stability. While preferably being described as branched polyphosphonates, the present methods and compositions are not limited by this description and the polyphosphonate may have linear, cyclic, or partially cross linked oligomers of polyphosphonates wherein the properties broad molecular weight distribution with polydispersities of 3.2 or greater, preferably about 2.5 or greater, and more preferably about 2.3 or greater, an $M_w$ of greater than about 10,000, a $T_g$ of at least 100° C. (when the hydrolytically stable polyphosphonate or polyphosphonate is prepared with bisphenol A or a mixture of bisphenol A and other bisphenols and a phosphonium catalyst), a relative viscosity of at least 1.1, transparency, and hydrolytic stability are produced. Due to the broad molecular weight distribution and relatively high $M_w$, the branched polyphosphonates of this invention exhibit an excellent combination of high $T_g$, toughness, and processability that could not be realized by other synthetic methods which result in lower polydispersities. It was unexpected that the use of molar excess of either monomer in conjunction with a phosphonium catalyst would produce such results.

On completion of the polycondensation reaction to form a polyphosphonate or a hydrolytically stable polyphosphonate, the polyphosphonate melt formed may be converted by methods known for processing polymers into granulates or directly into shaped structures, such as films, fibres, sheet, or bristles. The polyphosphonates thus obtained may be processed in the melt in standard processing machines, such as extruders and injection-molding machines, into products characterized by extreme flame resistance and high thermal stability under load. Other valuable properties of the polyphosphonates according to the invention are their excellent mechanical properties, such as for example their extreme toughness and their tensile strength Articles of manufacture can be made from the thermoplastic polyphosphonates of the present invention. Such article would be advantageous in high temperatures, high humidity environments, or environments where the need to reduce the risk or spread of fire is important. The branched polyphosphonate of the present invention, composites, or as blends with other thermoplastics may be fashioned into a variety of materials which include but are not limited to those such as fibers, a film, a coating, a molding, a foam, a fiber reinforced article, or any combination thereof of the polyphosphonates of the present invention. These materials may be fashioned into articles such as but not limited to a tent and other field portable structures, uniforms, household appliance covers for television picture tubes, toasters, irons, or components used in automotive, aviation, or marine vehicles.

The properties of polyphosphonates may be changed to address the material needs and physical property needs of a particular end use application. For example, in an application such as the housing for an outboard motor where a relatively small amount of polyphosphonate is used but hydrolytic stability and flame resistance highly desirable, it may be desirable to make a polyphosphonate composition by the present methods using a second heating stage with added polymerization catalyst, preferably a phosphonium catalyst, and long heating times. The polyphosphonate formed by this treatment is hydrolytically stable, preferably insoluble in a 0.5% methylene chloride solution, and preferably has a portion or all of the catalyst removed from the polyphosphonate by this treatment. The hydrolytically stable polyphosphonate having a relatively low melt flow index (i.e., high viscosity) could be formed into a housing by an extrusion operation. For intricate shaped objects, sufficient hydrolytic stability for molding may be all that is required, and a polyphosphonate with a short second stage heating process with catalyst may be better to produce a high melt flow index (i.e., low viscosity) because it is easier to ensure that a lower viscosity material will completely fill a mold cavity having a complicated shape with small openings.

The thermoplastic, aromatic polyphosphonates obtained by the process of the present invention may be extruded into test specimens at 220° C. to 350° C. The mechanical properties of various polyphosphonates specimens of the present invention can be impact tested both by measuring impact strength according to ASTM D 256 and by measuring notched impact strength according ASTM D 256. Hardness of test plaques may be measured by ball indentation hardness HK in accordance with DIN 53 456. The mechanical-elastic properties may be tested by strain-deformation tests, for example by measuring the E-modulus in bend in accordance with DIN 53 457, by measuring the E-modulus in tension in accordance with DIN 53 457. Thermal stability under load may tested by measuring the Vicat softening point (VSP) in accordance with DIN 53 460 or ISO/R 75. The transparency of the coupons may be compared using UV-VIS absorption spectroscopy or by visual inspection.

The branched polyphosphonates produced via the synthetic method of the present invention are self-extinguishing in that they immediately stop burning when removed from a flame. Any drops produced by melting these branched polyphosphonates in a flame instantly stop burning and do not propagate fire to any surrounding materials. Moreover, these branched polyphosphonates do not evolve any noticeable smoke when a flame is applied. The LOI of a material is indicative of its ability to burn once ignited. The test for LOI is performed according to a procedure set forth by the American Society for Test Methods (ASTM). The test, ASTM D2863, provides quantitative information about a material's ability to burn or "ease of burn". If a polymeric material has an LOI of at least 27, it will, generally, burn only under very high applied heat. Fire resistance may also be tested both by measuring the $O_2$ index in accordance with ASTM D 2863-70 and also by measuring the after-burning time in accordance with the UL test (Subject 94).

In this test, the tested materials are given classifications of UL-94 V-O, UL-94 V-1 and UL-94 V-II on the basis of the results obtained with the ten test specimens. Briefly, the criteria for each of these UL-94-V-classifications are as follows:

UL-94 V-O the average burning and/or glowing time after removal of the ignition flame should not exceed 5 seconds and none of the test specimens should release and drips which ignite absorbent cotton wool.

UL-94 V-I: the average burning and/or glowing time after removal of the ignition flame should not exceed 25 seconds and none of the test specimens should release any drips which ignite absorbent cotton wool.

UL-94 V-II: the average burning and/or glowing time after removal of the ignition flame should not exceed 25 seconds and the test specimens release flaming particles which ignite absorbent cotton wool.

When using bisphenol A, a branching agent is not required. Without wishing to be bound by theory it is believed that a portion of the bisphenol A can undergo one or more reactions that produce compounds and oligomers that contain multiple hydroxy groups that subsequently function as branching agents (e.g., forms branching agents in-situ). Bisphenol A and other similar bisphenols can be termed splitable bisphenols because they can undergo these reactions to form branching species in situ under polycondensation conditions.

In the examples that use excess phosphonic acid diaryl ester, polyphosphonates prepared from methyldiphenoxyphosphine oxide and bisphenol A exhibited a $T_g$ of at least 100° C. The polyphosphonates prepared in these examples are nearly colorless, have low haze exhibit, and have $M_w$ ranging from 12,000 to 35,000 g/mole with polymer dispersities greater than about 3.

Polymerization catalysts used in the present invention facilitate the condensation polymerization reaction between phosphonic diaryl esters and or phosphoric triaryl esters and hydroxy aromatics such as but not limited to bisphenol A, or bisphenol A in combination with other bisphenols. The polymerization catalyst may include a mixture of catalysts and optionally a co-catalyst chosen so that polyphosphonates made by them have a broad molecular weight distribution with polydispersities of 3.2 or greater, preferably about 2.5 or greater, and more preferably 2.3 or greater, a $M_w$ of greater than about 10,000, a $T_g$ of at least 100° C. when the hydrolytically stable polyphosphonate or polyphosphonate is prepared with bisphenol A or a mixture of bisphenol A and other bisphenols and the polymerization catalyst. These polymerization catalysts are less alkaline than NaOH, and preferably do not contain an alkaline, alkaline earth, or other metal cation. The catalysts are preferably removable by heating during the polycondensation reaction. Removal of a portion or all of the catalyst from the reaction melt may be controlled by the heating cycle, time, vessel pressure, and vapor pressure of the catalyst. The catalyst from the melt can be removed by evaporation, sublimation, or thermal decomposition. Polymerization catalysts useful in the process of the present invention are illustrated by those of the formula (XII):

wherein (XV) may be a nitrogen, phosphorous, or arsenic atom, and is preferably phosphorous. The counter ion "A" is an anion which may be but is not limited to, phenolate, acetate, borohydrides, halogen, hydroxide, propionate, formate, butyrate; $R_{a-d}$ may independently be phenyl, tert butyl, methyl, ethyl, propyl, butyl, or other groups provided that the catalyst acts as a polymerization catalyst to form polyphosphonates of the present invention, preferably those including a bisphenol A monomer. Preferably the anion is phenolate or acetate. The polymerization catalyst may be chosen based upon its catalytic activity as well as vapor pressure. Where it is desirable to remove as much catalyst as possible from the reaction melt, a catalyst having a lower vapor pressure cab be chosen.

The catalyst having structure (XII) is employed in an amount corresponding to between about 0.00004 moles to about 0.0012 moles per one mole of the dihydroxy aromatic used to for the polyphosphonate. The amount of catalyst may be used to control the rate of reaction and control molecular weight. The polymerization catalyst may be added in a variety of forms according to the method of the present invention. The catalyst may be added as a solid, for example a powder, dissolved in a solvent, or as a melt. Where an increase in molecular weight of a polyphosphonate is desired the amount of catalyst, a catalyst with a lower vapor pressure, or a lower pressure of the vessel may be used to increase molecular weight. The molecular weight of polyphosphonate made by the process of the present invention can range from about 10,000 to about 35,000 g/mole.

A phosphonium polymerization catalyst is preferred in various embodiments of the present invention. Even more preferably, the phosphonium catalyst is a tetraphenylphosphonium catalyst or its derivatives and associated anion. Examples of preferred anions include tetraaryl borohydride, a halide, and a substituted or unsubstituted phenolate group (commercially available from, for example, Fisher Scientific, Pittsburgh, Pa.; Fisher Scientific; and Sigma-Aldrich). Most preferred catalyst for use herein is tetraphenylphosphonium phenolate. The molar amount of phosphonium catalyst used (relative to the molar amount of bisphenol) is from about 0.00004 moles to about 0.0012 moles per one mole of bisphenol.

Phosphonic acid diaryl esters or mixtures of them used for making polyphosphonates of the present invention include those of formula (XIII):

(XIII)

wherein each $(R^8)_u$ and each $(R^{10})_v$ can independently be a hydrogen, lower alkyl of $C_1$-$C_4$, and u and v are independently integers where u=1-5, and v=1-5; $R^9$ can be lower alkyl $C_1$-$C_4$. In preferred embodiments, the phosphonic acid diaryl ester includes methyl-phosphonic acid diphenyl ester or methyldiphenoxyphosphine oxide where $R^9$ is a methyl radical.

Phosphoric triaryl esters may also be used in the polymerization reaction and correspond to the following formula (XIV).

(XIV)

wherein each $(R^5)_p$, $(R^6)_q$, and $(R^7)_r$ can independently be a hydrogen, lower alkyl of $C_1$-$C_4$, and wherein p, q, and r are integers independently ranging from 1-5. A preferred phosphoric triaryl ester is phosphoric triphenyl ester.

Various dihydroxy aromatic compounds may be used alone or in combination with one another in the present invention to form polyphosphonates and polyphosphonates which are more hydrolytically stable, have $T_g$ higher than polyphosphonates made with the same dihydroxy aromatic compounds, when one bisphenol is BPA, phosphonic diaryl ester, and a sodium phenolate catalyst, and have a polydispersity above about 2.3. These dihydroxy aromatic compounds may be but are not limited to those represented by the structure (XV):

(XV)

wherein each $(R^1)_m$ and $(R^2)_n$ can independently be a hydrogen, halogen atom, nitro group, cyano group, $C_1$-$C_{20}$ alkyl group, $C_4$-$C_{20}$ cycloalkyl group, or $C_6$-$C_{20}$ aryl containing group; m and n are independently integers 1-4; and Q may be a bond, oxygen atom, sulfur atom, or $SO_2$ group for non-splitable bisphenols, and for splitable bisphenols Q may be the group wherein $R^3$ and $R^4$ can independently be a hydrogen atom, lower alkyl $C_1$-$C_4$ alkyl group, aryl, and substituted aryl. $R^3$ and $R^4$ may combine to form a $C_4$-$C_{20}$ cycloaliphatic ring which is optionally substituted by one or more $C_1$-$C_{20}$ alkyl groups, aryl groups, or a combination thereof.

Preferably the bisphenol used in the method and composition of the present invention includes bisphenol A. Where bisphenol A is combined with other bisphenols like 2,2-bis (4-hydroxy-3-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; 4,4'-dihydroxydiphenyl; 4,4'-dihydroxydiphenylether; 4,4'-dihydroxydiphenylsulfide; 4,4'dihydroxydiphenylsulfone, 9,9-dihydroxy-diphenylfluorene; 1,1-bis(4-hydroxyphenyl)-3,3-dimethyl-5-methylcyclohexane (TMC) formula (XVI) the amount of bisphenol A may range from less than 100% to less than about 0.5%. These bisphenols are commercially available from, for example, Sigma-Aldrich Co., Milwaukee, Wis.; Biddle Sawyer Corp., New York, N.Y.; and Reichold Chemicals, Inc., Research Triangle Park, N.C., or may be prepared using literature methods.

(XVI)

Preferred trihydroxy and tetrahydroxy compounds for preparing polyphosphonates with a $T_g$ of at least 100° C. and which may further be treated to form hydrolytically stable polyphosphonates may include but are not limited to phloroglucinol; 4,6-dimethyl-2,4,6-tri-(4-hydroxy phenyl)-2-heptene; 4,6-dimethyl-2,4,6-tri-(4-hydroxy phenyl)-heptane; 1,3,5-tri-(4-hydroxy phenyl)-benzene; 1,1,1-tri-(4-hydroxy phenyl)-ethane; tri-(4-hydroxy phenyl)-phenyl methane; 2,2-bis-[4,4-bis-(4-hydroxy phenyl)-cyclohexyl]-propane; 2,4-bis-(4-hydroxy phenyl)isopropyl phenol; 2,6-bis-(2'-hydroxy-5'-methyl benzyl)-4-methyl phenol 2-(4-hydroxy phenyl)-2-(2,4-dihydroxy phenol)-propane; tetra-(4-hydroxy phenyl)methane; tetra-[4-(4-hydroxy phenyl isopropyl)phenoxy]-methane and 1,4-bis-(4,4''-dihydroxy triphenyl methyl)-benzene or mixtures thereof.

In the preparation of polyphosphonates where an additional branching agent is used, for example where the hydroxy aromatic compound cannot split like bisphenol A to form hydroxylated compounds in situ, the branching agent contains at least more than two functional groups that can be hydroxyl or phosphorus ester. Examples include 1,1,1-tris(4- hydroxyphenyl)ethane, trisphenyl phosphate, oligomeric isopropenyl phenol and others. A preferred branching agent is 1,1,1-tris(4-hydroxyphenyl)ethane (a product of DuPont, Wilmington, Del., commercially available from Electronic Polymers, Dallas, Tex.). The molar amount of branching agent used (relative to one mole of bisphenol) is from about 0.0005 moles to about 0.030 moles, with the range of about 0.0010 moles to about 0.020 moles per one mole of bisphenol being preferred.

The ability to use lower purity monomer to make the polyphosphonates of the present invention is a major advantage because it mitigates the need for additional purification steps, which contributes to cost reduction. By following the method of the present invention, branched polyphosphonates with outstanding flame resistance, improved heat stability, improved toughness in combination with improved processability from a polydispersity greater than 2.3 are obtained. In addition, a second heating step after the reaction imparts improved hydrolytic stability and extremely clear, haze-free polyphosphonates. The term "improved heat stability", as used herein, refers to an increase in the glass transition temperature of the branched polyphosphonates of the present invention as compared to other previously reported branched polyphosphonates. For example, the branched polyphosphonate based on bisphenol A described in U.S. Pat. No. 4,331,164, (column 10) and in Die Angewandte Makromolekulare Chemie [(Vol. 132, 8 (1985)] has a Tg of 90° C., whereas the branched polyphosphonates of the present invention using bisphenol A, methyldiphenoxy-phospine oxide, and a phosphonium catalyst exhibit $T_g$ of at least 107° C. Both samples have similar relative solution viscosities. This significant increase in $T_g$ implies a better retention of properties at elevated temperatures.

Hydrolytic stability may be measured by immersing samples of polyphosphonates prepared in boiling water for several hours and measuring the amount of decomposition. The hydrolytically stable polyphosphonate is made from a polyphosphonate prepared with bisphenol A or a mixture of bisphenol A and other bisphenols and a phosphonium catalyst. This hydrolytically stable polyphosphonate can have a polydispersity of 3.2 or more, preferably about 2.5 or more, and more preferably 2.3 or more, an $M_w$ of greater than about 15,000 g/mol, or an $\eta_{rel}$ of at least 1.15. For purposes of the present invention hydrolytically stable materials exhibit less than 20%, preferably less that 5% degradation in strength and or a change in mass. The hydrolytic stability may also be measured by thermal gravimetric analysis with a water vapor containing gas or a gas saturated with water. Preferably less than 5% mass change is observed. The hydrolytic stability may be measured on coupons of polyphosphonate, immersed in boiling water for various lengths of time and comparing the viscosity of treated coupons to those of untreated coupons as disclosed in U.S. Pat. No. 4,594,404.

The polyphosphonates of the present invention may be combined with miscible thermoplastics to form blends. This polymer composition may include at least one branched polyphosphonate of the present invention with at least one other miscible polymer, which may be a commodity or engineering plastic. The polymer composition may be produced via blending, mixing, or compounding the constituent polymers. Due to the structure and properties of the polyphosphonates of the present invention, the resulting polymer compositions exhibit exceptional flame resistance (e.g., higher LOI), in the case of blending with polycarbonate exceptional heat stability (minimal $T_g$ depression as illustrated in Example 4), and processing characteristics (e.g., reduced melt viscosity in the case of blending with polycarbonate) and low color. The term "polymer composition", as used herein, refers to a composition that comprises at least one branched polyphosphonate of the present invention and at least one other polymer. Examples of these other polymers include but are not limited to polycarbonate, polyacrylate, polyacrylonitrile, polyester, polyamide, polystyrene (including high impact strength polystyrene), polyurethane, polyepoxy, poly(acrylonitrile butadiene styrene), polyimide, polyarylate, poly(arylene ether), polyethylene, polypropylene, polyphenylene sulfide, poly (vinyl ester), polyvinyl chloride, bismaleimide polymer, polyanhydride, liquid crystalline polymer, cellulose polymer, or any combination thereof (commercially available from, for example, GE Plastics, Pittsfield, Mass.; Rohm & Haas Co., Philadelphia, Pa.; Bayer Corp.—Polymers, Akron, Ohio; Reichold; DuPont; Huntsman LLC, West Deptford, N.J.; BASF Corp., Mount Olive, N.J.; Dow Chemical Co., Midland, Mich.; GE Plastics; DuPont; Bayer; Dupont; ExxonMobil Chemical Corp., Houston, Tex.; ExxonMobil; Mobay Chemical Corp., Kansas City, Kans.; Goodyear Chemical, Akron, Ohio; BASF Corp.; 3M Corp., St. Paul, Minn.; Solutia, Inc., St. Louis, Mo.; DuPont; and Eastman Chemical Co., Kingsport, Tenn., respectively). The polymer compositions may be produced via blending, mixing, or compounding the constituent miscible polymers. The branched polyphosphonates of the present invention impart unexpectedly high flame retardant properties and significantly better processability to the resulting polymer compositions, with a negligible effect on their heat stability, toughness, and color as illustrated in Table III.

It is contemplated that branched polyphosphonates or the polymer compositions of the present invention may comprise other components, such as but not limited to glass, metal, carbon based, or ceramic fibers; fillers, surfactants, organic binders, polymeric binders, crosslinking agents, coupling agents, anti-dripping agents, colorants, inks, dyes, or any combination thereof.

The branched polyphosphonates and the polymer compositions of the present invention can be used as coatings on plastics, metals, ceramic, or wood products or they can be used to fabricate articles, such as free-standing films, fibers, foams, molded articles and fiber reinforced composites. These articles may be well-suited for applications requiring fire resistance.

The branched polyphosphonates of the present invention and compositions including them exhibit outstanding flame resistance and a more advantageous combination of heat stability (e.g., Tg), toughness in combination with processability from the polydispersity of the polyphosphonates which is at least about 2.5 and preferably at least about 2.3, hydrolytic stability and low haze as compared to other branched polyphosphonates. Such improvements make these materials useful in applications in the automotive and electronic sectors that require outstanding fire retardancy, high temperature performance, and low haze. The method for synthesizing these branched polyphosphonates requires less pure starting materials than the state-of-the-art methods, which thereby reduces production costs.

Various aspects of the present invention will be illustrated with reference to the following non-limiting examples.

EXAMPLE 1

This example illustrates the synthesis of a branched polyphosphonate or the present invention using a phosphonium catalyst, di and trihydroxy aromatic compounds and a diaryl phosphonic acid ester. The formed polyphosphonate exhibited a relative viscosity of 1.18 at 25° C. The solid exhibited a Tg of about 104.5° C. by DSC Branched Polyphosphonate A 250 mL, three neck round bottom flask equipped with a mechanical stirrer, distillation column (10 cm) filled with hollow glass cylinders, condenser, and vacuum adapter with control valve was flushed with nitrogen for 0.5 hour. Methyldiphenoxy-phosphine oxide (38.66 g)—because this compound is 95.9% pure as determined by high performance liquid chromatography (HPLC)—the precise amount of this compound is actually (37.07 g, 0.1493 moles), 2,2-bis(4-hydroxyphenyl)propane (bisphenol A), (33.28 g, 0.1458 moles), tetraphenylphosphonium phenolate (0.012 g, 2.77× $10^{-5}$ moles, 0.00019 mole per one mole of bisphenol) and 1,1,1-tris(4-hydroxyphenyl)ethane (0.459 g, 0.0015 mole, 0.0103 mole per mole of bisphenol) were placed into the flask and the flask was flushed with nitrogen again. (This is an excess of 2.4 percent of the number of moles of methyldiphenoxyphosphine oxide relative to the molar amount of bisphenol). The distillation column was wrapped with heating tape and heated. The reaction vessel was placed in an oil bath and heated to 246° C. until the solids in the flask melted. The reaction mixture was further heated and the vacuum was adjusted at various times during the reaction as indicated in Table I below.

TABLE I

REACTION PARAMETERS FOR EXAMPLE 1

| Time after starting (minutes) | Oil Bath Temp. (° C.) | Vapor Temp. (° C.) | Vacuum (mm Hg) |
|---|---|---|---|
| 0 | 246 | 29 | 760 |
| 15 | 251 | 32 | 420 |
| 30 | 253 | 33 | 183 |
| 90 | 240 | 28 | 183 |
| 105 | 252 | 28 | 177 |
| 110 | 254 | 110 | 99 (Phenol began to distill) |
| 120 | 258 | 96 | 89 |
| 180 | 265 | 80 | 85 |
| 210 | 266 | 84 | 23 |
| 240 | 287 | 75 | 5 |
| 255 | 291 | 110 | 0 |
| 315 | 306 | 65 | 0 (Began heating column) |
| 360 | 316 | 147 | 0 |
| 390 | 308 | 150 | 0 |
| 420 | 309 | 152 | 0 |

TABLE I-continued

REACTION PARAMETERS FOR EXAMPLE 1

| Time after starting (minutes) | Oil Bath Temp. (° C.) | Vapor Temp. (° C.) | Vacuum (mm Hg) |
|---|---|---|---|
| 450 | 314 | 148 | 0 |
| 510 | 313 | 149 | 0 |
| 600 | 314 | 145 | 0 |
| 660 | Stopped | Stopped | Stopped |

During the course of this reaction 31.4 g of distillate was collected. At the end of the reaction there was an increase in the viscosity of the polymer melt. Upon cooling, the viscous, pale yellow melt began to solidify. As it solidified, the solid was tough and peeled glass off of the inner walls of the flask. After further cooling to room temperature, the flask was broken to isolate the solid. The solid polymer could not be cracked or broken with a hammer. It was so tough that it had to be removed from the stirring shaft with a saw. A 0.5% solution of the polymer in methylene chloride exhibited a relative viscosity of 1.18 at 25° C. The solid exhibited a $T_g$ of about 104.5° C. by differential scanning calorimetry (DSC; TA Instruments Inc., Model 2010). There was no evidence of any insoluble material indicating that no cross-linked polymer was formed. A film was cast, in accordance to common casting methods, from a methylene chloride/polymer solution onto plate glass and subsequently thermally treated to remove the solvent. The film was transparent and colorless. It should be noted that the reaction temperature was held at slightly above 300° C. for more than about 3.5 hours. During this time, no decrease in the melt viscosity was observed, and there was no subsequent indication that a cross-linked polymer was formed.

A plaque was fabricated from this polymer by compression molding. This plaque was subjected to a burn test by placing the plaque directly in the flame of a propane torch. The plaque first softened and then melted due to its thermoplastic nature. Drops of molten plastic that dripped from the plaque immediately self extinguished once they were out of the direct flame. In addition, the drops did not spread or propagate the fire to any surrounding materials. The plaque also stopped burning immediately upon removal of the flame. During this test, no dark smoke evolved from the plaque while it was in the flame or after the flame was removed. This test demonstrates the outstanding flame retardant characteristics of this polyphosphonate and, most importantly, its ability to self extinguish. These properties are important for applications requiring fire resistance.

EXAMPLE 2

This example illustrates the synthesis of a branched polyphosphonate or the present invention using a phosphonium catalyst, di and trihydroxy aromatic compounds and a diaryl phosphonic acid ester. The formed polyphosphonate exhibited a relative viscosity of 1.19 at 25° C. and the solid exhibited a $T_g$ of about 105.6° C. by DSC reaction mixture was further heated and the vacuum was adjusted at various times during the reaction as indicated in Table II below.

TABLE II

REACTION PARAMETERS FOR EXAMPLE 2

| Time after starting (min) | Oil Bath Temp. (° C.) | Vapor Temp. (° C.) | Vacuum (mm Hg) |
|---|---|---|---|
| 0 | 246 | 30 | 760 |
| 15 | 259 | 30 | 267 |
| 30 | 261 | 30 | 168 |
| 60 | 242 | 30 | 168 |

Branched Polyphosphonate

A 250 mL, three neck round bottom flask equipped with a mechanical stirrer, distillation column (10 cm) filled with hollow glass cylinders, condenser, and vacuum adapter with control valve was flushed with nitrogen for 0.5 hour. Methyldiphenoxyphosphine oxide (38.66 g)—because this compound is 95.9% pure as determined by HPLC—the precise amount of this compound is actually (37.07 g, 0.1493 moles), 2,2-bis(4-hydroxyphenyl)propane (bisphenol A), (33.28 g, 0.1457 moles), tetraphenylphosphonium phenolate (0.012 g, 2.77×10$^{-5}$ moles, 0.00019 mole per one mole of bisphenol) and 1,1,1-tris(4-hydroxyphenyl)ethane (0.459 g, 0.0015 mole, 0.0103 moles per mole of bisphenol) were placed into the flask and the flask was flushed with nitrogen again. (This is an excess of 2.4% mole excess of methyldiphenoxyphosphine oxide relative to the molar amount of bisphenol). The distillation column was wrapped with heating tape and heated. The reaction vessel was placed in an oil bath and heated to 246° C. until the solids in the flask melted. The TABLE II-continued

REACTION PARAMETERS FOR EXAMPLE 2

| Time after starting (min) | Oil Bath Temp. (° C.) | Vapor Temp. (° C.) | Vacuum (mm Hg) |
|---|---|---|---|
| 90 | 240 | 32 | 143 |
| 96 | 240 | 32 | 315 |
| 112 | 254 | 112 | 113 (Phenol began to distill) |
| 150 | 260 | 95 | 103 |
| 192 | 256 | 85 | 137 |
| 203 | 264 | 100 | 97 |
| 240 | 258 | 95 | 46 |
| 280 | 271 | 50 | 1 (Began heating column) |
| 330 | 300 | 107 | 0 |
| 379 | 307 | 120 | 0 |
| 416 | 310 | 110 | 0 |
| 450 | 313 | 114 | 0 |
| 509 | 315 | 125 | 0 |
| 538 | 321 | 130 | 0 |
| 561 | 313 | 120 | 0 |
| 581 | 308 | 115 | 2 |
| 607 | 307 | 120 | 3 |
| 625 | 306 | 120 | 3 |

TABLE II-continued

REACTION PARAMETERS FOR EXAMPLE 2

| Time after starting (min) | Oil Bath Temp. (° C.) | Vapor Temp. (° C.) | Vacuum (mm Hg) |
|---|---|---|---|
| 685 | 306 | 120 | 3 |
| 690 | Stopped | Stopped | Stopped |

During the course of this reaction 34.4 g of distillate was collected. At the end of the reaction there was an increase in the viscosity of the polymer melt. Upon cooling, the viscous, light yellow melt began to solidify. As it solidified, the solid was very tough and peeled glass off of the inner walls of the flask. After further cooling to room temperature, the flask was broken to isolate the solid. The solid polymer could not be cracked or broken with a hammer. It was so tough that it had to be removed from the stirring shaft with a saw. A 0.5% solution of the polymer in methylene chloride exhibited a relative viscosity of 1.19 at 25° C. The solid exhibited a $T_g$ of about 105.6° C. by DSC. There was no evidence of any insoluble material indicating that no cross-linked polymer was formed. A film was cast from a methylene chloride/polymer solution onto plate glass and subsequently thermally treated to remove the solvent. The film was transparent and colorless. It should be noted that the reaction temperature was held at slightly above 300° C. for more than about 3.5 hours. During this time, no decrease in the melt viscosity was observed, and there was no subsequent indication that any cross-linked polymer was formed.

A plaque was compression molded from this polymer. The plaque was subjected to a burn test by placing the plaque directly in the flame of a propane torch. The plaque first softened and then melted due to its thermoplastic nature. Drops of molten plastic that dripped from the plaque immediately self extinguished once they were out of the direct flame. In addition, the drops did not spread or propagate the fire to any surrounding materials. The plaque also stopped burning immediately upon removal of the flame. During this test, no dark smoke evolved from the plaque while it was in the flame or after the flame was removed. This test demonstrates the outstanding flame retardant characteristics of this polyphosphonate and most importantly its ability to self extinguish. These properties are important for applications requiring fire resistance.

EXAMPLE 3

This example illustrates preparation of a polyphosphonate using an alkali phenolate catalyst and bisphenol A. The formed polyphosphonate exhibited a relative viscosity of 1.09 at 23° C. and the solid exhibited a $T_g$ of about 90.6° C. by DSC Branched Polyphosphonate A branched polyphosphonate was prepared following information contained in U.S. Pat. Nos. 4,331,614 and 4,415,719 for comparison with the branched polyphosphonates of the present invention. The molar excess of 2,2-bis(4-hydroxyphenyl)propane (bisphenol A), (33.28 g, 0.1457 moles) to the phosphonic diester (37.07 g, 0.1493 mole) was 2.4 mole %. The amount of sodium phenolate used (0.006 g, 5.16×10$^{-5}$ moles) was 3.54×10$^{-4}$ moles relative to one mole of bisphenol, and (0.459 g, 1.5×10$^{-3}$ moles) of 1,1,1-tris(4-hydroxyphenyl)ethane (i.e., branching agent) was used. The reaction, conducted under conditions similar to those described for Examples 1 and 2, yielded a relatively viscous melt. The polymer was isolated and it exhibited some toughness, but not as tough as the polymers described in Examples 1 and 2. A 0.5% solution of the polymer in methylene chloride exhibited a relative viscosity of about 1.09 at 23° C. A film was cast from methylene chloride solution, it exhibited a Tg of about 90.6° C., lower toughness, and yellow color.

EXAMPLE 4

This example illustrates the preparation of a polymer composite formed by blending of branched polyphosphonate according to the present invention and polycarbonate and evaluation of its properties.

The branched polyphosphonate of Example 1 and a commercially available polycarbonate, Bayer® 2858, were melt mixed in a Brabender™ mixing machine with co-rotating 25 mm mixing elements. The samples were melt mixed at 230° C., 20 rpm for 5 minutes. The molten blend was subsequently removed from the mixing head and placed into an open mold (10 cm×10 cm) and heated to 220° C. for 15 minutes. The mold was subsequently closed and 20 bar of pressure was applied and held for 15 minutes. The mold was air-cooled and the molded plaque (10 cm×10 cm×0.3 cm) was removed. The limiting oxygen index (LOI) of the plaque was measured in accordance to ASTM D2863. The relevant data for this polymer composition is presented in Table III.

TABLE III

Polyphosphonate/polycarbonate blend polymer characterization.

| Polyphosphonate (%) | Polycarbonate (%) | Tg (° C.) (from Brabender) | LOI (from mold) |
|---|---|---|---|
| 0 | 100 | 146-148 | 26 |
| 10 | 90 | 145 | 28.6 |
| 20 | 80 | 143 | 44 |
| 100 | 0 | 105 | >50 |

The results indicate that the addition of 10-20%, by weight, of the branched polyphosphonate of the present invention to a commercial polycarbonate provides a significant improvement in the LOI. In addition, the polyphosphonate does not significantly depress the $T_g$ of the resulting blend polymer composition. This is very advantageous because it does not lower the use temperature. This behavior is unexpected because as a general rule, the effect of mixtures on the $T_g$ in polycarbonates predicts that at a loading level of 10% and 20%, by weight, of the polyphosphonate, the resulting blend polymer composition should exhibit a $T_g$ of 142° C. and 138° C., respectively.

EXAMPLE 5

This example illustrates the synthesis of hydrolytically stable polyphosphonates. A series of branched polyphosphonates according to the invention were prepared at different stoichiometries using the equipment and conditions described for Examples 1 and 2. The detailed information for each batch is provided in Table IV below.

TABLE IV

Polyphosphonate Batch Information

| Batch | BPA (g) | % Purity P-Diester | P-Diester (g) | Catalyst (g) | Branching Agent (g) | Tg (° C.) | η rel | $M_W$ | Comment |
|---|---|---|---|---|---|---|---|---|---|
| FX-176 | 33.28 | 97.7 | 30.61 | 0.0125 | 0.9192 | 105 | 1.12 | ~12000 | Excess BPA; minus 20% P-diester |
| FX-178 | 33.28 | 97.7 | 32.18 | 0.0127 | 0.9207 | 107 | 1.14 | ~14000 | Excess BPA; Minus 11.8% P-Diester |
| FX-182 | 33.28 | 95.6 | 38.80 | 0.0128 | 0.4596 | 105 | 1.13 | | 1% excess P-Diester |
| FX-183 | 33.28 | 95.6 | 40.35 | 0.0128 | 0.4596 | 106 | 1.15 | | 5% excess P-Diester |
| FX-184 | 33.28 | 95.6 | 42.31 | 0.0128 | 0.4596 | 106 | 1.19 | | 10% excess P-Diester |
| FX-155-1A | 33.28 | 92 | 40.33 | 0.012 | 0.459 | 103 | Can not be determined as not soluble | | 1% excess P-Diester Longer reaction time (8.5 hr); post reaction with 20 g of product + 6 mg catalyst and 2.5 hr post reaction time according to steps 9-15 below. After postreaction not fully soluble in $CH_2Cl_2$. |

BPA = 2,2-bis(4-hydroxyphenyl)propane (bisphenol A)

P-Diester = Methyldiphenoxyphosphine oxide

The reaction conditions for each run are summarized in Table V. In addition to following these parameters, these examples were subjected to a "post reaction" step. This step involved additional heating at 305° C., but with a much shorter distillation path allowing for additional volatile removal and optionally addition of a new amount of catalyst. This step was found to provide an improved combination of hydrolytic stability and haze (e.g., improved transparency) while maintaining processability. The reactions described in Example 5 were conducted according to the following general procedure.

The chemicals are charged into the reactor. (The chemical stoichiometries are describes on Table IV.). The temperature controller of the oil bath is turned on to heat the oil baths to 250° C. and the temperature controller for the distilling column was turned on to heat the columns to 130° C. Ice was placed into the collector trap and liquid nitrogen was placed into the second trap. When the oil temperature reached 250° C., the vacuum regulator was adjusted to 200 mm Hg, the vacuum pump was turned on and the vacuum valve was opened. The reactions were conducted according to the parameters in Table V. The oil bath was removed, the vacuum valve closed and the vacuum pump turned off. The reaction mixture was allowed to cool for 16 hours. The vacuum valve was opened.

In a second stage or post-reaction the 75° angle distillation adapter was re-installed directly to the right neck of the 250 ml flask of the first reaction step and connected to a new two-neck 100 ml flask that served as a collector/trap. After optionally adding new catalyst (see example FX 155-1A in table IV), the vacuum regulator was set to 0 (full vacuum) and the vacuum pump turned on, and the vacuum valve was opened. Heating tape was applied from the right neck of the 250 ml flask to the top angle of the distillation adapter. The temperature controller of the oil bath was set to 305° C. The temperature controller for the tape wrapping the distillation adapter was set to 150° C. The reaction was heated at 305° C. for 5-6 hours or shorter when new catalyst was used. After heating for 1 hour, the temperature controller for the tape wrapping the distillation adapter was set to 180° C.

TABLE V

Reaction Parameters for Example 5

| Time (min) | Oil Bath Temp. (° C.) | Distillation column Temp. (° C.) | Vacuum (mm Hg) | Comment |
|---|---|---|---|---|
| — | 250 | 130 | | Start heating |
| 0 | 250 | 130 | 200 | Start vacuum |
| 30 | 250 | 130 | 150 | |
| 55 | 250 | 130 | 100 | |
| 125 | 250 | 100 | 80 | |
| 135 | 250 | 100 | 50 | |
| 170 | 250 | 100 | 20 | |
| 200 | 250 | 100 | 10 | |
| 210 | 250 | 100 | <0.3 | Full vacuum |
| 225 | 270 | 100 | <0.3 | |
| 270 | 305 | 100 | <0.3 | |
| 290 | 305 | 130 | <0.3 | |
| 295 | 305 | 150 | <0.3 | |
| 315 | 305 | 180 | <0.3 | |
| 360 | 305 | 180 | <0.3 | Turn off the heat |

EXAMPLE 6

This example illustrates the hydrolytic stability of polyphosphonates of the present invention compared to the polyphosphonate preparation of Example 3.

Figure 1:
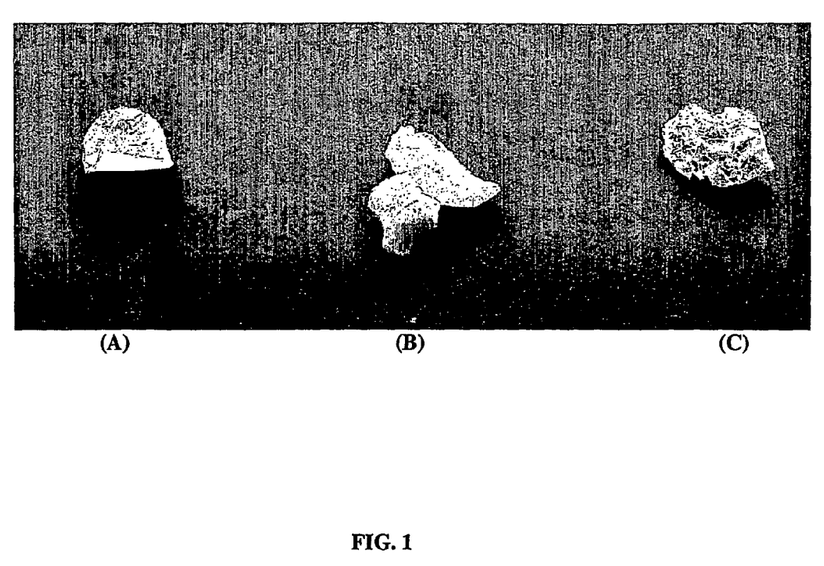
FIG. 1 is a photograph of: (A) sample of polyphosphonate prepared using a sodium phenolate polymerization catalyst of Example 3; (B) sample of polyphosphonate prepared using a sodium phenolate polymerization catalyst of Example 3 after treatment in boiling water; (C) sample of the polyphosphonate of Example 5 of the present invention after the same treatment in boiling water.

A molded sample (approximately 2 cm×2 cm×1 cm thick) of the polyphosphonates prepared as described in Example 3, FIG. 1(A) (state-of-the-art comparison sample prepared using sodium phenolate as catalyst) and Example 5 (FX-155-1A, Table IV) were placed in distilled water and heated to 100° C. for 6 hours. Prior to the water exposure, the samples were transparent and in a single piece. After exposure, the polyphosphonate molding from Example 3 had broken into several smaller pieces that had a frosty white, opaque surface and appeared to have foamed presumably due to volatile generation as shown in FIG. 1 (B). The small pieces were fragile and broke easily upon handling. The polyphosphate molding from Example 5 remained in one piece and exhibited no whitening (except for a very small area on one corner) and little reduction in visual transparency as illustrated in FIG. 1 (C). In addition, there were no visible signs of foaming. This example demonstrates the improvement in hydrolytic stability that the polyphosphonates of the present invention compared to previously reported polyphosphonates.

EXAMPLE 7

This example illustrates polyphosphonate compositions of the present invention having various polydispersities which can be obtained from the method of the present invention.

| Sample | % molar excess or deficiency of methyldiphenoxyphosphine oxide | $\eta_{rel}$ | $M_n$ | $M_w$ | Dispersity |
|---|---|---|---|---|---|
| FX161-1A | +1 | 1.21-1.22 | 3579 | 20081 | 5.61 |
| FX164-1A | −1 | 1.17 | 3305 | 16604 | 5.02 |
| FX-171-1A | −10 | 1.11 | 3167 | 10142 | 3.20 |
| FX173-1A | +10 | 1.14 | 3392 | 14403 | 4.25 |
| FX186-1A | +15 | 1.25 | | | |
| FX189-1A | +15 | 1.30 | | | |

Although the present invention has been described in considerable detail with reference to certain preferred embodiments thereof, other versions are possible. Therefore the spirit and scope of the appended claims should not be limited to the description and the preferred versions contain within this specification.

What is claimed is:

1. A method of making branched polyphosphonates comprising:
   combining a phosphonium catalyst, phosphonic acid diaryl ester and bisphenol in a ratio to form a polyphosphonate to form a reaction mixture; and
   heating said reaction mixture at a reduced pressure to form the polyphosphonate.

2. The method of claim 1, wherein said reaction mixture further comprises a branching agent.

3. The method of claim 1, wherein said bisphenol forms branching agent in situ.

4. The method of claim 1, wherein at least a portion of said phosphonium catalyst is removed during said heating.

5. The method of claim 1, wherein phosphonic acid diaryl ester and bisphenol are combined in a non-stoichiometric ratio.

6. The method of claim 1, wherein said bisphenol is a mixture of 2,2-bis(4-hydroxyphenyl) propane and a bisphenol of formula (XV):

(XV)

wherein:
  each $(R^1)_m$ and $(R^2)_n$ is independently hydrogen, halogen, nitro, cyano, $C_1$-$C_{20}$ alkyl, $C_4$-$C_{20}$ cycloalkyl, or $C_6$-$C_{20}$ aryl containing group;
  m and n are independently integers of from 1-4; and
  Q is a bond, oxygen, sulfur, or $SO_2$; or
  Q is:

wherein $R^3$ and $R^4$ are independently hydrogen, $C_1$-$C_4$ alkyl, aryl, and substituted aryl, or $R^3$ and $R^4$ are combined to form a $C_4$-$C_{20}$ cycloaliphatic ring which is optionally substituted by one or more $C_1$-$C_{20}$ alkyl, aryl, or a combination thereof.

7. The method of claim 1, wherein said heating is stopped when substantially all generated hydroxy aromatic compound is removed.

8. The method of claim 1, further comprising:
heating the polyphosphonate at reduced pressure in the presence of a removable phosphonium catalyst to form a hydrolytically stable polyphosphonate.

9. The method of claim 8, wherein less than 0.5 g of hydrolytically stable polyphosphonate is soluble in 100 ml volume of methylene chloride at about 23° C.

10. The method of claim 8, wherein said polyphosphonate has a polydispersity of greater than about 2.3.

11. The method of claim 8, wherein said polyphosphonate comprises monomer derived units derived from 2,2-bis(4-hydroxyphenyl) propane.

12. The method of claim 8, wherein said phosphonium catalyst comprises tetraphenylphosphonium phenolate.

13. The method of claim 8, wherein at least a portion of the phosphonium catalyst is removed by the heating.

14. A composition comprising:
a polyphosphonate 2,2-bis(4-hydroxyphenyl) propane comprising monomer derived units and having a $T_g$ of at least 100° C., a relative viscosity of greater than 1.1 when measured on a 0.5 percent solution in methylene chloride, an $M_W$ of at least 10,000 g/mol, and a polydispersity of 2.3 or greater.

15. A composition comprising:
a polyphosphonate having a $T_g$ of at least 100° C. made by heating phosphonic acid diaryl ester and 2,2-bis(4-hydroxyphenyl) propane with a removable phosphonium catalyst at a reduced pressure.

16. The composition of claim 15, wherein said phosphonic acid diaryl ester comprises methyl-phosphonic acid diphenyl ester.

17. The composition of claim 15, further comprising bisphenols of formula (XV):

(XV)

wherein:
  each $(R^1)_m$ and $(R^2)_n$ is independently hydrogen, halogen, nitro, cyano, $C_1$-$C_{20}$ alkyl, $C_4$-$C_{20}$ cycloalkyl, or $C_6$-$C_{20}$ aryl containing;
  m and n are independently integers of from 1-4; and
  Q is a bond, oxygen, sulfur, or $SO_2$; or
  Q is:

wherein $R^3$ and $R^4$ are each independently hydrogen, $C_1$-$C_4$ alkyl, aryl, and substituted aryl, or $R^3$ and $R^4$ are combined to form a $C_4$-$C_{20}$ cycloaliphatic ring which is optionally substituted by one or more $C_1$-$C_{20}$ alkyl, aryl, or a combination thereof.

18. A composition comprising:
a polyphosphonate 2,2-bis(4-hydroxyphenyl) propane having derived repeat units, wherein said polyphosphonate has a $T_g$ of at least 100° C., a relative viscosity of greater than 1.15 when measured on a 0.5 percent solution in methylene chloride, an $M_W$ of at least 15,000 g/mol, a polydispersity of 2.3 or greater, and which is hydrolytically stable.

19. A composition comprising:
a hydrolytically stable polyphosphonate having a $T_g$ of at least 100° C. made by heating at reduced pressure a polyphosphonate and a removable phosphonium catalyst.

20. The composition of claim 19, wherein less than 0.5 g of said hydrolytically stable polyphosphonate is soluble in 100 milliliters of methylene chloride at about 23° C.

21. The composition of claim 19, wherein less than 5% degradation product are formed when the polyphosphonate is heated in boiling water for 6 hours.

22. The composition of claim 19, wherein said hydrolytically stable polyphosphonate is transparent.

23. The composition of claim 19, wherein said polyphosphonate comprises repeating units derived from 2,2-bis(4-hydroxyphenyl) propane.

24. A method for producing branched polyphosphonates, comprising:
combining one or more phosphonic acid diaryl ester, 2,2-bis(4-hydroxyphenyl) propane or a mixture of 2,2-bis(4-hydroxyphenyl) propane and other bisphenols, and a phosphonium catalyst to form a reaction mixture wherein said one or more phosphonic acid diaryl ester is in a stiochiometric equivalent amount or excess amount of said 2,2-bis(4-hydroxyphenyl) propane or 2,2-bis(4-hydroxyphenyl) propane and other bisphenols;
heating said mixture; and
removing phenol generated by the heating to form a polyphosphonate.

25. The method of claim 24, wherein said reaction mixture further comprises a branching agent.

26. The method of claim 24, wherein the number of moles of reactive groups of the phosphonic acid diaryl ester is within about ±20% of the number of moles of reactive groups from said bisphenol.

27. The method of claim 24, wherein the phosphonium catalyst is tetraphenylphosphonium phenolate.

28. The method of claim 25, wherein the branching agent comprises 1,1,1-tris(4-hydroxyphenyl)ethane.

29. The method of claim 24, wherein the one or more phosphonic acid diaryl ester is of formula (XIII):

wherein:
each $(R^8)_u$ and $(R^{10})_v$ are independently hydrogen, lower alkyl of $C_1$-$C_4$;
u and v are independently integers of from 1-5; and
$R^9$ is lower alkyl $C_1$-$C_4$.

30. The method of claim 24, wherein the phosphonic acid diaryl ester comprises methyl-phosphonic acid diphenyl ester.

31. The method of claim 24, further comprising a phosphoric triaryl ester.

32. The method of claim 24, wherein said other bisphenols are of formula (XV):

wherein:
each $(R^1)_m$ and $(R^2)_n$ are independently hydrogen, halogen, nitro, cyano, $C_1$-$C_{20}$ alkyl, $C_4$-$C_{20}$ cycloalkyl, or $C_6$-$C_{20}$ aryl containing group;
m and n are independently integers of from 1-4; and
Q is a bond, oxygen, sulfur, or $SO_2$; or
Q is group:

wherein $R^3$ and $R^4$ are each independently hydrogen, $C_1$-$C_4$ alkyl, aryl, and substituted aryl, or $R_3$ and $R_4$ are combined to form a $C_4$-$C_{20}$ cycloaliphatic ring which is optionally substituted by one or more $C_1$-$C_{20}$ alkyl, aryl, or a combination thereof.

33. The method of claim 24, wherein the other bisphenols are selected from 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; 4,4'-dihydroxydiphenyl; 4,4'-dihydroxydiphenylether; 4,4'-dihydroxydiphenylsulfide; 4,4'dihydroxydiphenylsulfone, 9,9-dihydroxy-diphenylfluorene; 1,1-bis(4-hydroxyphenyl)-3,3-dimethyl-5-methyl cyclohexane, or a combination of these.

34. A method of making polyphosphonates comprising:
heating a polyphosphonate and a phosphonium catalyst in a vessel to form a hydrolytically stable polyphosphonate.

35. A polyphosphonate prepared by a method comprising:
combining one or more phosphonic acid diaryl ester, 2,2-bis(4-hydroxyphenyl) propane or 2,2-bis(4-hydroxyphenyl) propane and other bisphenols, and a phosphonium catalyst wherein said phosphonic acid diaryl ester is in a stiochiometric equivalent amount or excess amount of said bisphenol to form a reaction mixture;
heating the reaction mixture at reduced pressure to form a polyphosphonate; and
removing material generated by the heating;
wherein the polyphosphonate exhibits a $T_g$ of at least 100° C.

36. The polyphosphonate of claim 35, wherein the polyphosphonate has a relative viscosity of at least 1.1 when measured on a 0.5 percent solution in methylene chloride at 23° C., and a polymer dispersity of 2.3 or greater.

37. The polyphosphonate of claim 35, wherein the other bisphenols are selected from 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; 4,4'-dihydroxydiphenyl; 4,4'-dihydroxydiphenylether; 4,4'-dihydroxydiphenylsulfide; 4,4'dihydroxydiphenylsulfone, 9,9-dihydroxy-diphenylfluorene; 1,1-bis(4-hydroxyphenyl)-3,3-dimethyl-5-methyl cyclohexane, or a combination of these.

38. The polyphosphonate of claim 35, wherein the one or more phosphonic acid diaryl esters are of formula (XIII):

wherein:
each $(R^8)_u$ and $(R^{10})_v$ are independently hydrogen, $C_1$-$C_4$ alkyl;
u and v are integers of from 1-5; and
$R^9$ is $C_1$-$C_4$ alkyl.

39. A composition comprising:
a polyphosphonate and a tetraphenylphosphonium catalyst in a reaction vessel heated at reduced pressure whereby a hydrolytically stable polyphosphonate is formed.

40. The composition of claim 39, wherein said polyphosphonate forms less than 5% degradation product when heated in boiling water for 6 hours.

41. The method of claim 1, wherein the bisphenol is 2,2-bis(4-hydroxyphenyl) propane.

42. The method of claim 1, wherein the phosphonic acid diaryl ester comprises methyl-phosphonic acid diphenyl ester.

43. The method of claim 1, wherein the phosphonium catalyst is tetraphenylphosphonium phenolate.

44. The method of claim 8, wherein phosphonium catalyst is added to the polyphosphonate before heating.

* * * * *